United States Patent
Cobb et al.

(10) Patent No.: US 8,291,095 B2
(45) Date of Patent: Oct. 16, 2012

(54) METHODS AND SYSTEMS FOR CONTENT INSERTION

(75) Inventors: Jonathan W. Cobb, Oakland, CA (US); Ryan B. Bloom, Raleigh, NC (US)

(73) Assignee: Limelight Networks, Inc., Tempe, AZ (US)

(*) Notice: Subject to any disclaimer, the term of this patent is extended or adjusted under 35 U.S.C. 154(b) by 331 days.

(21) Appl. No.: 11/406,675

(22) Filed: Apr. 18, 2006

(65) Prior Publication Data
US 2006/0242201 A1    Oct. 26, 2006

Related U.S. Application Data

(60) Provisional application No. 60/673,128, filed on Apr. 20, 2005.

(51) Int. Cl.
*G06F 15/16* (2006.01)

(52) U.S. Cl. ............... 709/229; 709/297; 705/14.49; 705/14.73; 705/14.6; 705/14.68; 707/725; 707/729; 707/746; 380/234; 455/3.06; 455/414.4; 725/32; 725/36

(58) Field of Classification Search .............. 709/229; 715/210, 517
See application file for complete search history.

(56) References Cited

U.S. PATENT DOCUMENTS

| | | | |
|---|---|---|---|
| 4,671,772 A | 6/1987 | Slade et al. | |
| 4,863,384 A | 9/1989 | Slade | |
| 5,099,422 A | 3/1992 | Foresman et al. | |
| 5,550,735 A | 8/1996 | Slade et al. | |
| 5,768,680 A * | 6/1998 | Thomas | 455/2.01 |
| 5,802,599 A * | 9/1998 | Cabrera et al. | 711/170 |
| 5,815,689 A * | 9/1998 | Shaw et al. | 713/400 |
| 6,115,035 A * | 9/2000 | Compton et al. | 715/717 |
| 6,216,152 B1 * | 4/2001 | Wong et al. | 709/203 |
| 6,236,009 B1 * | 5/2001 | Emigh et al. | 209/584 |
| 6,269,275 B1 | 7/2001 | Slade | |
| 6,654,814 B1 * | 11/2003 | Britton et al. | 709/246 |
| 6,704,930 B1 * | 3/2004 | Eldering et al. | 725/36 |
| 6,950,804 B2 | 9/2005 | Strietzel | |
| 7,107,582 B2 * | 9/2006 | Clarke et al. | 717/143 |
| 7,149,958 B2 | 12/2006 | Landsman et al. | |

(Continued)

FOREIGN PATENT DOCUMENTS

WO  WO 2007/051129 A2  5/2007

OTHER PUBLICATIONS

Govoni, "Dictionary of marketing communications", 2004, Sage Publications.*

(Continued)

*Primary Examiner* — Krista Zele
*Assistant Examiner* — Ondrej Vostal
(74) *Attorney, Agent, or Firm* — Kilpatrick Townsend & Stockton LLP

(57) ABSTRACT

A method for content insertion is provided. In this method, a first media data is received from a server and a placement request is transmitted to a content provider service. As a result, a placement response is received from the content provider service. The placement response includes data identifying a second media data associated with the first media data. The second media data is retrieved and merged with the first media data. After the merge, the first and second media data are transmitted to the server.

22 Claims, 6 Drawing Sheets

U.S. PATENT DOCUMENTS

| | | | |
|---|---|---|---|
| 7,165,036 B2 * | 1/2007 | Kruk et al. | 705/1 |
| 7,165,218 B1 * | 1/2007 | Hancock | 715/210 |
| 7,281,008 B1 * | 10/2007 | Lawrence et al. | 707/7 |
| 7,373,599 B2 * | 5/2008 | McElfresh et al. | 715/210 |
| 7,571,183 B2 * | 8/2009 | Renshaw et al. | 1/1 |
| 7,574,499 B1 * | 8/2009 | Swildens et al. | 709/223 |
| 7,640,296 B2 * | 12/2009 | Fuchs et al. | 709/203 |
| 7,747,465 B2 * | 6/2010 | Srinivasan et al. | 705/14.4 |
| 7,761,554 B1 * | 7/2010 | Hild et al. | 709/224 |
| 2001/0037314 A1 * | 11/2001 | Ishikawa | 705/67 |
| 2002/0010798 A1 * | 1/2002 | Ben-Shaul et al. | 709/247 |
| 2002/0042738 A1 * | 4/2002 | Srinivasan et al. | 705/14 |
| 2002/0065912 A1 * | 5/2002 | Catchpole et al. | 709/224 |
| 2003/0001846 A1 * | 1/2003 | Davis et al. | 345/474 |
| 2003/0012409 A1 * | 1/2003 | Overton et al. | 382/103 |
| 2003/0097443 A1 * | 5/2003 | Gillett et al. | 709/225 |
| 2003/0101412 A1 * | 5/2003 | Eid | 715/513 |
| 2003/0129956 A1 * | 7/2003 | Virolainen | 455/306 |
| 2003/0149937 A1 * | 8/2003 | McElfresh et al. | 715/517 |
| 2003/0149938 A1 * | 8/2003 | McElfresh et al. | 715/517 |
| 2003/0191816 A1 * | 10/2003 | Landress et al. | 709/219 |
| 2004/0003398 A1 * | 1/2004 | Donian et al. | 725/34 |
| 2004/0019497 A1 | 1/2004 | Volk et al. | |
| 2004/0019675 A1 * | 1/2004 | Hebeler et al. | 709/224 |
| 2004/0103024 A1 * | 5/2004 | Patel et al. | 705/14 |
| 2004/0107169 A1 * | 6/2004 | Lowe | 705/59 |
| 2004/0117427 A1 * | 6/2004 | Allen et al. | 709/200 |
| 2004/0125140 A1 * | 7/2004 | Bell et al. | 345/765 |
| 2004/0186894 A1 * | 9/2004 | Jhingan et al. | 709/207 |
| 2004/0200337 A1 * | 10/2004 | Abe et al. | 84/616 |
| 2004/0210948 A1 * | 10/2004 | Jin et al. | 725/145 |
| 2004/0225562 A1 * | 11/2004 | Turner | 705/14 |
| 2005/0081239 A1 | 4/2005 | Makowski et al. | |
| 2005/0091111 A1 * | 4/2005 | Green et al. | 705/14 |
| 2005/0137958 A1 * | 6/2005 | Huber et al. | 705/37 |
| 2005/0149880 A1 * | 7/2005 | Postrel | 715/808 |
| 2005/0188403 A1 * | 8/2005 | Kotzin | 725/47 |
| 2005/0273388 A1 * | 12/2005 | Roetter | 705/14 |
| 2006/0010390 A1 * | 1/2006 | Guido et al. | 715/742 |
| 2006/0021057 A1 * | 1/2006 | Risan et al. | 726/26 |
| 2006/0149624 A1 * | 7/2006 | Baluja et al. | 705/14 |
| 2006/0195859 A1 * | 8/2006 | Konig et al. | 725/19 |
| 2007/0112762 A1 | 5/2007 | Brubaker | |
| 2007/0180066 A1 * | 8/2007 | Sherwood et al. | 709/220 |
| 2008/0091767 A1 | 4/2008 | Afergan et al. | |
| 2008/0102947 A1 * | 5/2008 | Hays et al. | 463/31 |
| 2009/0030802 A1 * | 1/2009 | Plotnick et al. | 705/14 |
| 2010/0082439 A9 * | 4/2010 | Patel et al. | 705/14.72 |

OTHER PUBLICATIONS

Green, "Adding Streaming Media to Your Web Site with Windows Media Technologies", 1999, Microsoft Corporation.*

Plotnick U.S. Appl. No. 60/281,037, "Personal Video REcorder (PVR) Market Overview and Advertising Opportunities", Apr. 3, 2001.*

"Podbridge," <http://www.podbridge.com/home/index.php?action=show_about> (visited Dec. 8, 2006).

* cited by examiner

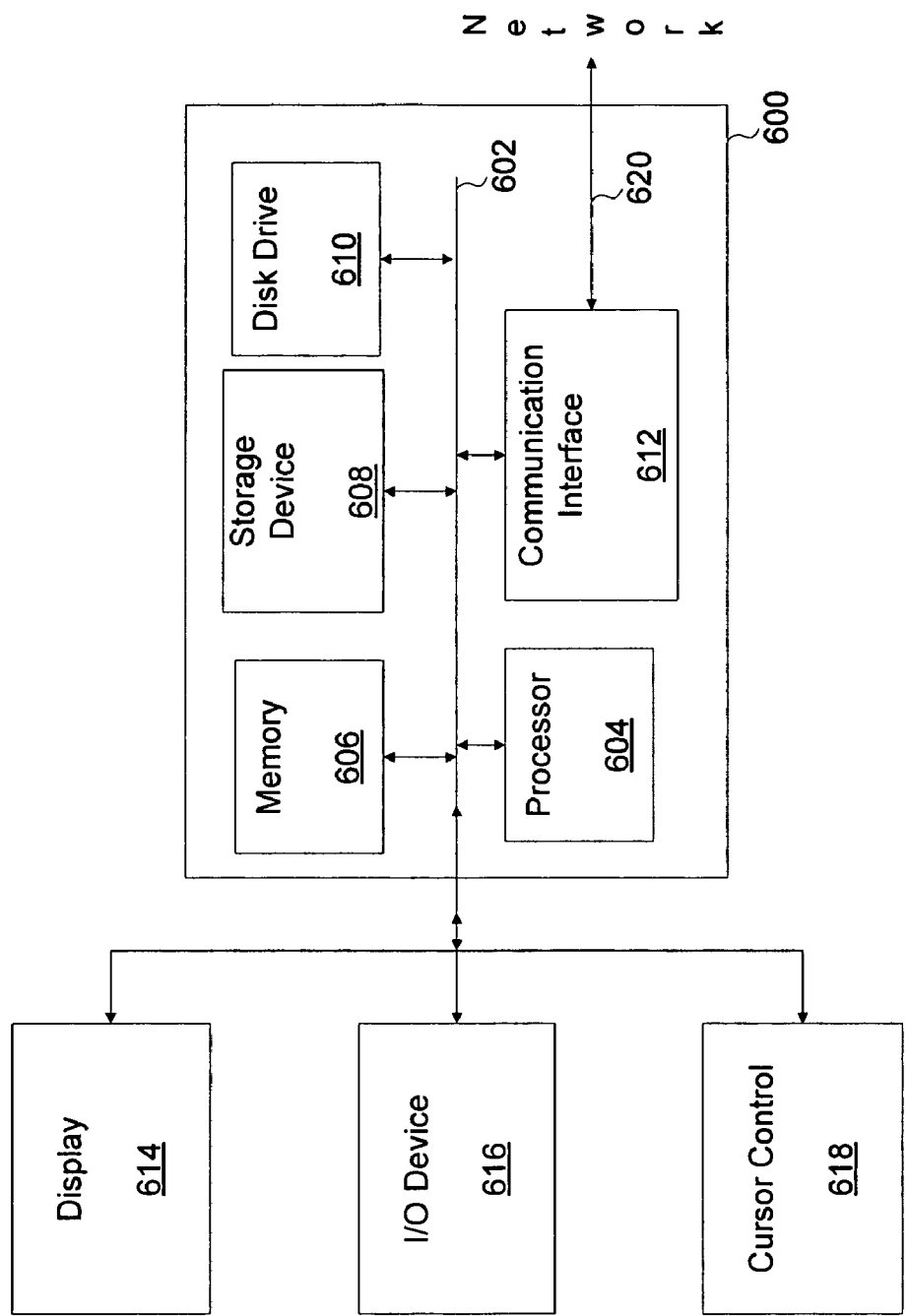

METHODS AND SYSTEMS FOR CONTENT INSERTION

CROSS-REFERENCES TO RELATED APPLICATIONS

This application claims the benefit of U.S. Provisional Application No. 60/673,128, filed Apr. 20, 2005, which is herein incorporated by reference.

FIELD OF THE INVENTION

The present invention relates generally to software and, more particularly, to methods and systems for content insertion.

BACKGROUND

There are a variety of techniques to distribute and receive media data (e.g., audio files, video files, etc.) over a computer network. For example, podcasting is the distribution of media data, such as radio programs or music videos, over the Internet using World Wide Web (Web) feeds. Advertisers advertise on podcasts by placing advertisements in the distributed media data. For example, a listener may listen to a short radio announcement from an advertiser before the start of the radio program.

Currently, advertisements are manually combined with the media data such that the advertisements become a permanent part of the media data. For example, once the advertisement is placed at the start of the radio program, the advertisement will always play at the start of the radio program. An advertiser cannot change the advertisement to a different time or location within the radio program.

Furthermore, to determine the effectiveness of advertisements, advertisers typically track the number of times the advertisements are distributed or downloaded. A conventional tracking technique is to access the server logs to determine how many times the media data has been transmitted. However, accessing the server logs is inconvenient and the server logs cannot track when the advertisement was actually downloaded. Another conventional tracking technique is to attach a redirect (e.g., Universal Resource Locator (URL)) directed to a tracking service at the header of a response. Thus, instead of providing the media data, an URL to the media data is provided in the response. Every time the media data is requested, a client is redirected to the tracking service that tracks the number of times the advertisements are requested and provides the media data with the advertisements to the client. Therefore, to accurately track the advertisements, a redirect must be attached to every reference to the media file. Since there may be a large number of references to the media data across the Internet and because some of those references may be outside the control of the content owner, it is difficult to ensure that a redirect is attached to all requests. Thus, the attachment of redirects to track advertisements can be highly inaccurate.

As a result, there is a need for continuing efforts to improve the placement of advertisements or other contents on media data transmitted over a computer network.

BRIEF DESCRIPTION OF THE DRAWINGS

The present invention will be readily understood by the following detailed description in conjunction with the accompanying drawings, and like reference numerals designate like structural elements.

FIG. 6 is a block diagram illustrating an exemplary computer system suitable for the distribution of media data, in accordance with an embodiment.

DETAILED DESCRIPTION

Various embodiments may be implemented in numerous ways, including as a system, a process, an apparatus, or as computer program instructions included on a computer readable medium such as a computer readable storage medium or a computer network wherein program instructions are sent over optical or electronic communication links. In general, the steps of disclosed processes may be performed in an arbitrary order, unless otherwise provided in the claims.

A detailed description of one or more examples is provided below along with accompanying figures. The detailed description is provided in connection with such examples, but is not limited to any particular embodiment. The scope is limited only by the claims and numerous alternatives, modifications, and equivalents are encompassed. Numerous specific details are set forth in the following description in order to provide a thorough understanding. These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

The embodiments described herein provide methods and systems for placing an advertisement or other content into media data transmissions for distribution across a computer network. In general, a server (e.g., World Wide Web (Web) server) retrieves an advertisement and inserts the advertisement into a transmission of media data (e.g., a Web feed). In some embodiments, as will be explained in more detail below, the placement of advertisement may be tracked by counting the number of placement requests transmitted by the server.

Figure 1:
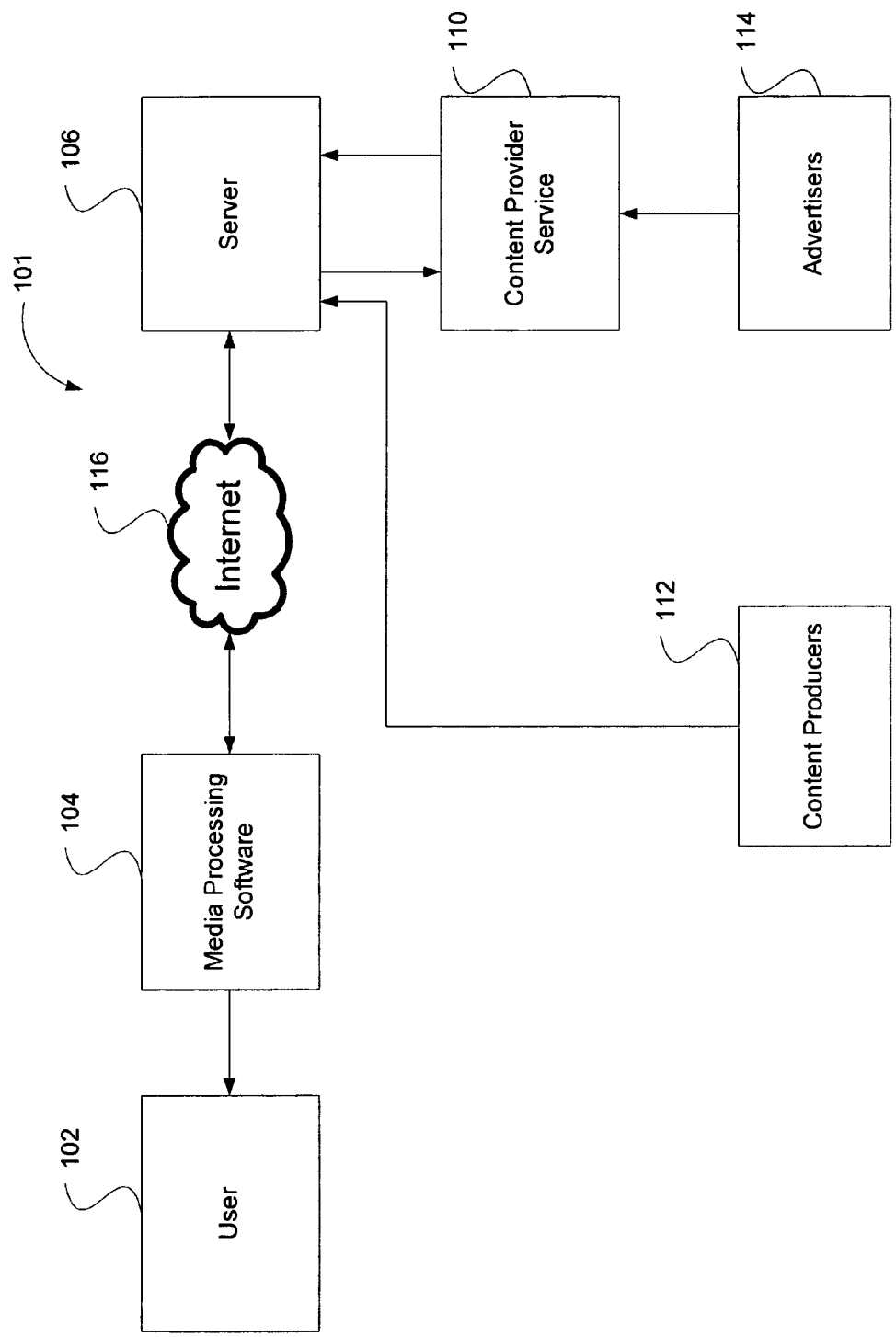
FIG. 1 is a simplified block diagram of a system for distributing media data, in accordance with an embodiment.

FIG. 1 is a simplified block diagram of a system for distributing media data, in accordance with an embodiment. As shown in FIG. 1, system 101 includes user 102, media processing software 104, server 106, content producers 112, content provider service 110, and advertisers 114. Content producers 112 create or produce media data for distribution to user 102. Media data includes audio, text, graphics, video, and other media. Media data may have a variety of attributes, such as media format, sampling rate, size, and other attributes. For example, media data may have a variety of media formats, and the media formats may be identified by data within the media data and/or by the filename extension. Exemplary media formats that may be associated with media data include MPEG-1 Audio Layer 3 (MP3), WAV (or WAVE), Advanced Audio Coding (AAC), Graphics Interchange Format (GIF), Joint Photographic Experts Group (JPEG), Moving Picture Experts Group (MPEG), Windows Media Audio (WMA) and other media formats. Additionally, in another example, the media data may have a variety of sampling rates (e.g., bit rates). Once content producers 112 create the media data for distribution, the media data may be uploaded to a hosting service that runs servers, such as server 106, allowing the media data to be distributed to user 102 by way of Internet 116, computer networks, or other communication channels.

Advertisers 114 or other content producers may want to insert other media data into the media data produced by content producers 112. For example, advertisers 114 may want to publicize their products or services to users 102 by inserting advertisements into the media data provided by content producers 112. Advertisers 114 create or produce media data and upload the media data to content provider service 110. Content provider service 110 allows advertisers 114 to manage the distribution of their media data. For example, advertisers 114 may use content provider service 110 to manage their advertising policy. Furthermore, content provider service 110 also transmits the media data provided by advertisers 114 to server 106 for distribution to user 102 by way of Internet 116. A variety of hosting services may host content provider service 110. For example, in some embodiments, content provider service 110 may be integrated into the content management tools that are hosted on a hosting service selected by advertisers 114. In addition to providing advertisers 114 with the ability to manage media data, content provider service 110 allows a large network of content producers 112 to have access to a large network of advertisers 114 and vice versa. For example, content producers 112 can search for one or more advertisers 114 though content provider service 110. With advertisers 114 located, content producers 112 may create an offer to the advertisers to carry the content (i.e., media data) provided by the advertisers. By way of content provider service 110, advertisers 114 may accept or reject the offer. In another example, an entity may be both content producers 112 and advertisers 114. In other words, both content producers 112 and advertisers 114 may be represented by the same entity. Here, for instance, the entity can use content provider service 110 to manage the advertisement sales of its advertisements. A sales organization within the entity could setup the advertisers and the entity may use content producers 112 both as content producers 112 and advertisers 114 to create and manage the advertisement campaigns.

Server 106 receives the media data provided by content producers 112 and by advertisers 114. It should be appreciated that server 106 is a computing device configured to execute software applications. Exemplary server 106 includes Web servers, FTP servers, and other servers. Server 106 hosts a filter module and, as will be explained in more detail below, the filter module may be configured to insert the media data provided by advertisers 114 into the media data provided by content producers 112. In other words, the filter module merges the media data provided by content producers 112 with the media data provided by advertisers 114.

After the insertion, server 106 transmits the merged media data to media processing software 104. Media processing software 104 receives or downloads the merged media data and is configured to render the merged media data onto speakers, displays, and other devices. Exemplary media processing software 104 includes Windows Media Player, iTunes, WinAmp, iPodder, and other media processing software. Media processing software 104 may receive merged media data by way of Internet 116, computer networks, or other communication channels. For example, in an embodiment, server 106 may transmit the merged media data to media processing software 104 by way of Internet 116 using HyperText Transfer Protocol (HTTP), File Transfer Protocol (FTP), Voice over Internet Protocol (VoIP), or other communication protocols.

Figure 2:
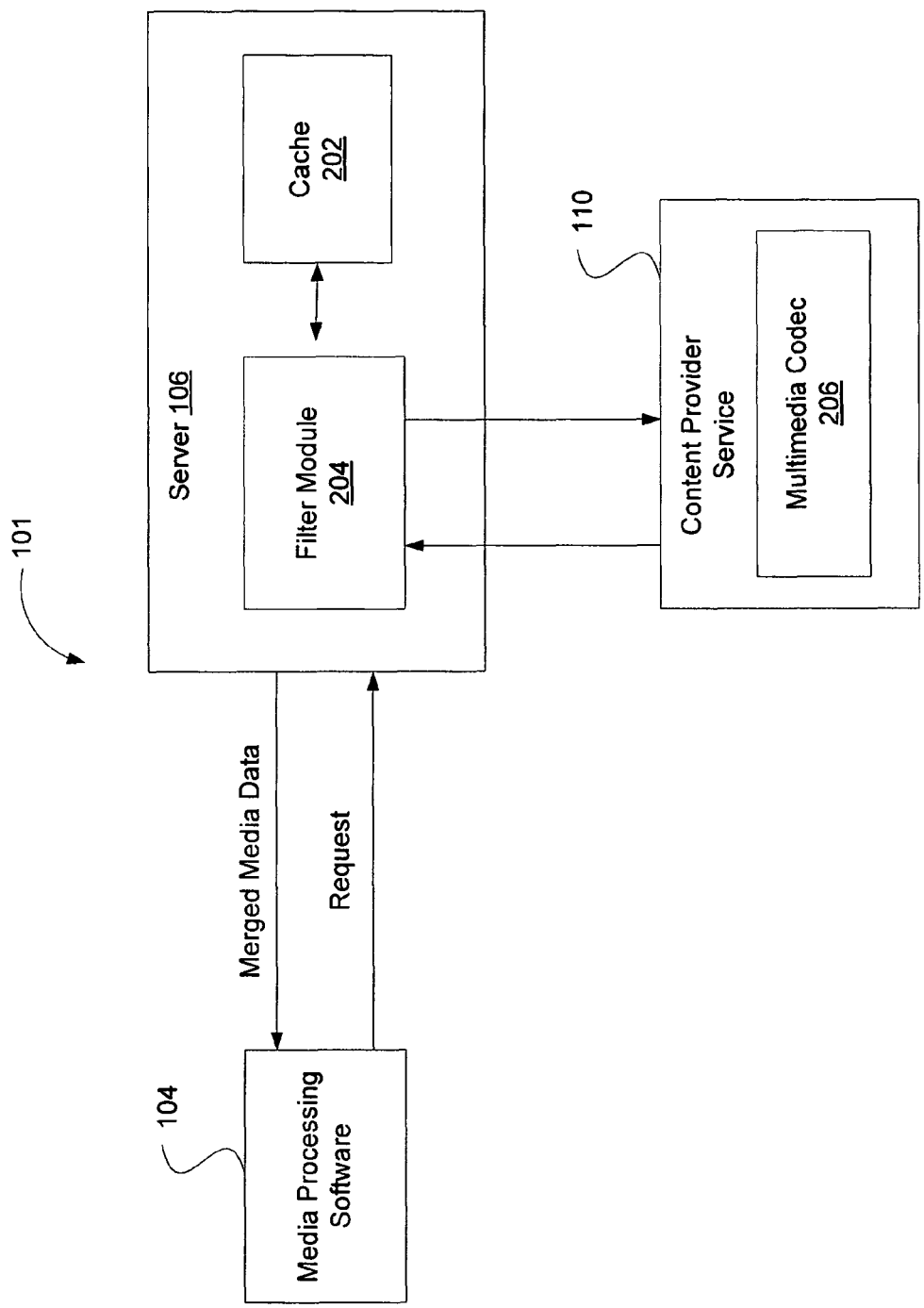
FIG. 2 is a detailed block diagram of the server and content provider service shown in FIG. 1, in accordance with an embodiment.

FIG. 2 is a detailed block diagram of the server and content provider service shown in FIG. 1, in accordance with an embodiment. As shown in FIG. 2, system 101 includes media processing software 104, server 106, and content provider service 110. As discussed above, content producers transmit media data to server 106 for distribution. To download the media data provided by content producers from server 106, media processing software 104 transmits a request for the media data to the server. Before transmitting the media data provided by content producers to media processing software 104, server 106 transmits the media data to filter module 204. In general, as will be explained in more detail below, filter module 204 may be configured to merge the media data provided by content producers with the media data provided by advertisers and/or configured to direct the merge operation. In an embodiment, filter module 204 may retrieve the media data provided by advertisers from content provider service 110. In another embodiment, filter module 204 may retrieve the media data provided by advertisers from cache 202. Filter module 204 then transmits the merged media data to server 106 for distribution to media processing software 104. In some embodiments, a static caching network (e.g., a Content Delivery Network) may be used to distribute the merged media data to media processing software 104. Here, filter module 204 is operated on an origin server (not shown) external to the static caching network. The origin server may direct the operation of the static caching network to serve (and cache) the merged media data as determined by content provider service 110.

In general, as will be explained in more detail below, content provider service 110 identifies the media data provided by advertisers to be inserted into the media data provided by the content producers. Content provider service 110 transmits the identification in a placement response to a placement request made by filter module 204. Content provider service 110 may also transmit the media data provided by advertisers to filter module 204. In some embodiments, content provider service 110 may additionally include multimedia codec 206 to encode and/or decode media data provided by advertisers into different media formats, sizes, and/or sample rates as requested by server 106.

Figure 3:
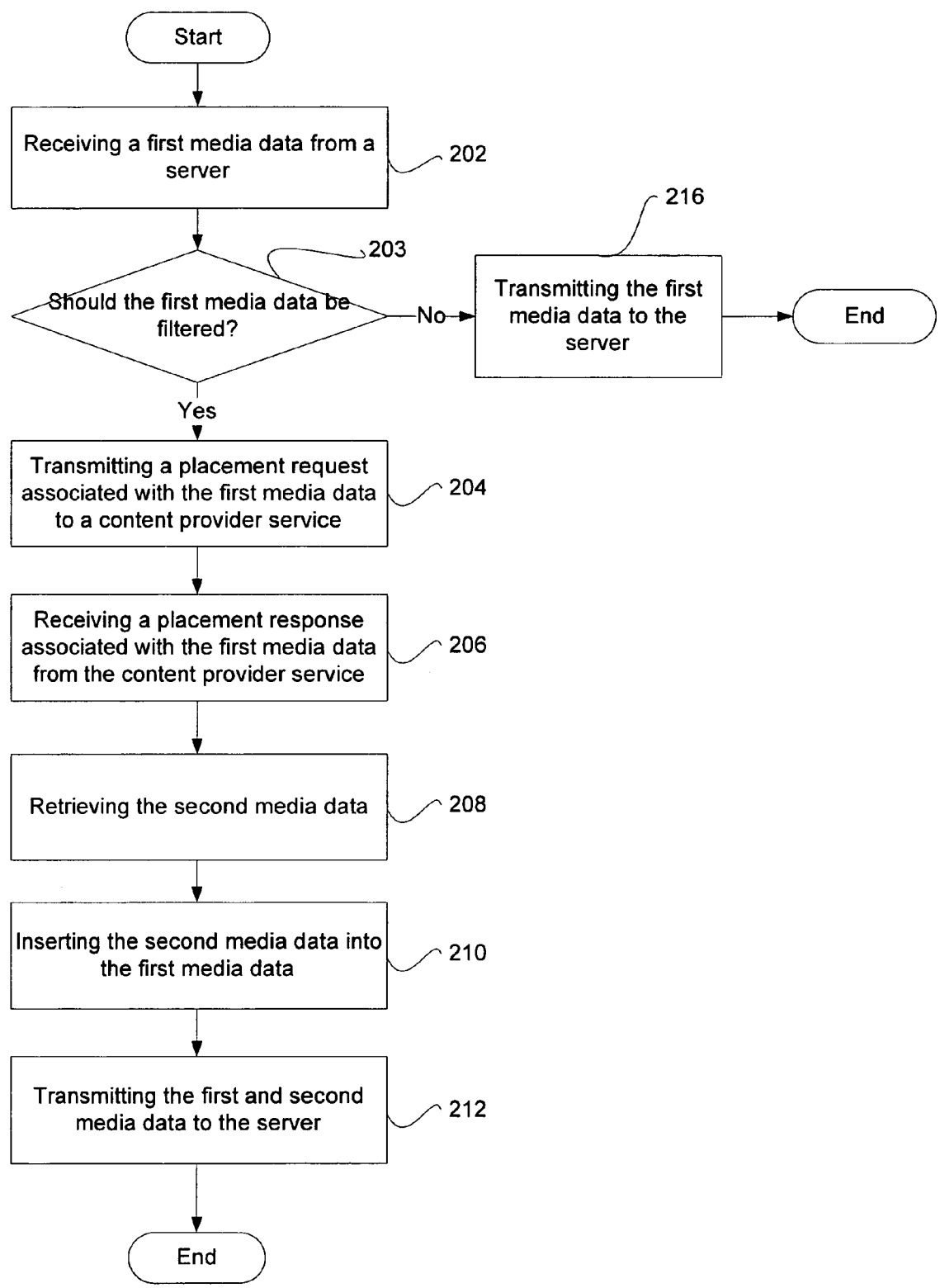
FIG. 3 is a flowchart diagram of the filter module processing media data, in accordance with an embodiment.

FIG. 3 is a flowchart diagram of the filter module processing media data, in accordance with an embodiment. As discussed above, a server hosts a filter module that is configured to merge media data. Before the server transmits media data provided by content providers (hereafter "first media data") for distribution, the server transmits the first media data to the filter module. As shown in FIG. 3, filter module receives the first media data from the server in operation 202. The filter module analyzes the request (e.g., HTTP request) for the first media data received by the server to determine, in operation 203, whether the request matches one or more criteria that indicate the first media data is to be filtered. If the first media data does not match the criteria, the filter module transmits the unmodified first media data to the server in operation 216 for distribution. For example, the filtering criteria may be based on pattern matching against the URL (e.g., http://match*/something[a-z]here/*) against the location of the file on the computer readable media (e.g., everything in C:/podcasts) and/or based on media format (e.g., filter audio/* and video/mpeg).

On the other hand, if the first media does match the criteria, the filter module transmits a placement request to the content provider service in operation 204. In some embodiments, the placement request may be an HTTP request, where the server can serve as an HTTP client, and the content provider service can serve as an HTTP server. The server and the content provider service may communicate, for example, with Representational State Transfer (REST) or Simple Object Access Protocol (SOAP). The placement request may include identification and/or authentication data that identify the content producers, listeners, listener locations, and other identification and/or authentication data. The placement request may additionally include data identifying the first media data. For example, the data identifying the first media data may be a list of entries based on the contents of the first media data (e.g., Extensible Markup Language (XML) feed) requested by the media processing software. The entries may include an article link URL that refers to the text/html article for the first media data. For instance, with RSS 2.0, the article may correspond to the contents of the <link> element of an <item> element, which uniquely identifies the entries. In another example, the entries may include a content link URL that refers to MP3 data or other media formats, such as WMA. With RSS 2.0, the content link URL may correspond to an <enclosure> element. In still another example, the entries may include a content type that is a text field defining the media format of the file referred to by the content link. For instance, the text field may include "audio/mpeg" for first media data with an MP3 media format. In RSS 2.0, the content type may correspond to the <enclosure> element.

As a result of the placement request, in operation 206, the filter module receives a placement response associated with the first media from the content provider service. In some embodiments, as will be explained in more detail below, the placement response may include data that identifies the media data provided by advertisers or other content providers (hereafter "second media data") associated with the first media data. The placement response may also include other identification and/or authentication data. With the information included in the placement response (e.g., data identifying the second media data and identification and/or authentication data), the filter module retrieves the second media data in operation 208. In an embodiment, the filter module may send a content request for the second media data to the content provider service. In response, the content provider service retrieves the second media data stored at the content provider service and transmits the second media data to the server. Alternatively, in another embodiment, the filter module may first check whether the second media data has been previously retrieved and stored in a cache, for example, the cache associated with the server shown in FIG. 2. If the second media data is stored in the cache, then the filter module retrieves the second media data from the cache. However, if the second media data is not stored in the cache, then the filter module transmits the content request for the second media data to the content provider service.

Thereafter, in operation 210, the filter module may insert the second media data into the first media data at the location associated with the first media data. In other words, in an embodiment, the filter module merges the first media data with the second media data. It should be appreciated that, in an embodiment, the second media data may be inserted into the first media data such that the second media data interrupts the first media data. For example, a still picture that is inserted and that interrupts the action of a video. In another embodiment, the second media data may be inserted into the first media data such that the second media data becomes a portion of the first media data. For example, scrolling text may be inserted into a portion of a video. In another example, a semi-transparent logo may be inserted as an overlay at a corner portion of a picture.

The second media data may be inserted at the beginning of the first media data, inserted at the end of the first media data, or inserted at a location between the beginning and the end of the first media data. To insert the second media data at the beginning or at the end of the first media data, the filter module concatenates together the first media data and the second media data. In an embodiment, a period of silence (e.g., one second) may be inserted between the first media data and the second media data to differentiate the second media data from the first media data.

To insert the second media data at a location between the beginning and the end of the first media data, a variety of insertion techniques may be used. For example, a quiet space detection technique may be used. With quiet space detection, a location associated with the first media data, which is included in the response, is initially located. The location may be, for example, identified by the span of time associated with the first media data (e.g., every ten minutes, at twenty seconds, and other time) and/or length associated with the first media data (e.g., at two bytes, at 2000 kilobytes). From this location associated with the first media data, two imaginary pointers are extended from the beginning of the of the first media data to the end of the first media data. Thereafter, each pointer is extended outwards from the location by a certain number of bytes corresponding to a time range, for example, one half second in each direction, which would create a window of one second.

If the maximum volume of the first media data within this window is below a specified threshold, then the first media data within this window may be a quiet space designated for the second media data, and the second media data may be inserted in the middle of the window. A specified time may be inserted at the ends of the second media data, for example, one half second of silence at both ends of the second media data. However, if the maximum volume within the window exceeds the specified threshold, then the window is moved towards both the beginning and the end of the first media data until the maximum program volume of the window is below the specified threshold. At this location, the second media data is inserted. If the window has moved more than a specified time and the maximum program volume is still greater than the specified threshold, then the second media data is not inserted into the first media data.

Another exemplary approach to insert the second media data at a location between the beginning and the end of the first media data is the explicit marker approach. With the explicit marker approach, the location within the first media data can be marked where the second media data can be inserted. A variety of marking techniques may be used. For example, first media data can include metadata tags that can indicate locations (e.g., via byte offset) where second media data can be inserted. For instance, with MP3-based first media data, locations may be stored in custom ID3 tags. Another exemplary marking technique includes signature byte markers where a sequence of bytes that identifies the location of insertion may be inserted into the first media data.

If the first media data includes metadata (e.g., ID3v1 or ID3v2 tags on MP3 files), the metadata can be preserved in the insertion operation. On the other hand, the metadata associated with the second media data may be erased when inserted into the first media data. It should be appreciated that, in another embodiment, the filter module may delegate or direct the insertion operation to another software module (e.g., an insertion module) or computing device configured to insert the second media data into the first media data. For example, in an embodiment, the filter module may transmit both the first media data and the second media data to the insertion module for insertion operations. After insertion, the insertion module transmits the first and second media data (i.e., merged media data) to the filter module. In another exemplary embodiment, the filter module may receive data identifying a location of the first media data (e.g., URL, pointers, and other location identifiers) from the server and receive data identifying a location of the first media data from the placement response. The filter module then transmits the data identifying the locations of the first media data and the second media data to the insertion module. The insertion module retrieves the first media data and second media data based on the data identifying the locations of the first media data and the second media data. Thereafter, the insertion module merges the first media data with the second media data and transmits the merged media data to the filter module. The filter module then transmits the merged media data to the server in operation 212. The server subsequently transmits the merged media data to a media processing software.

Figure 4:
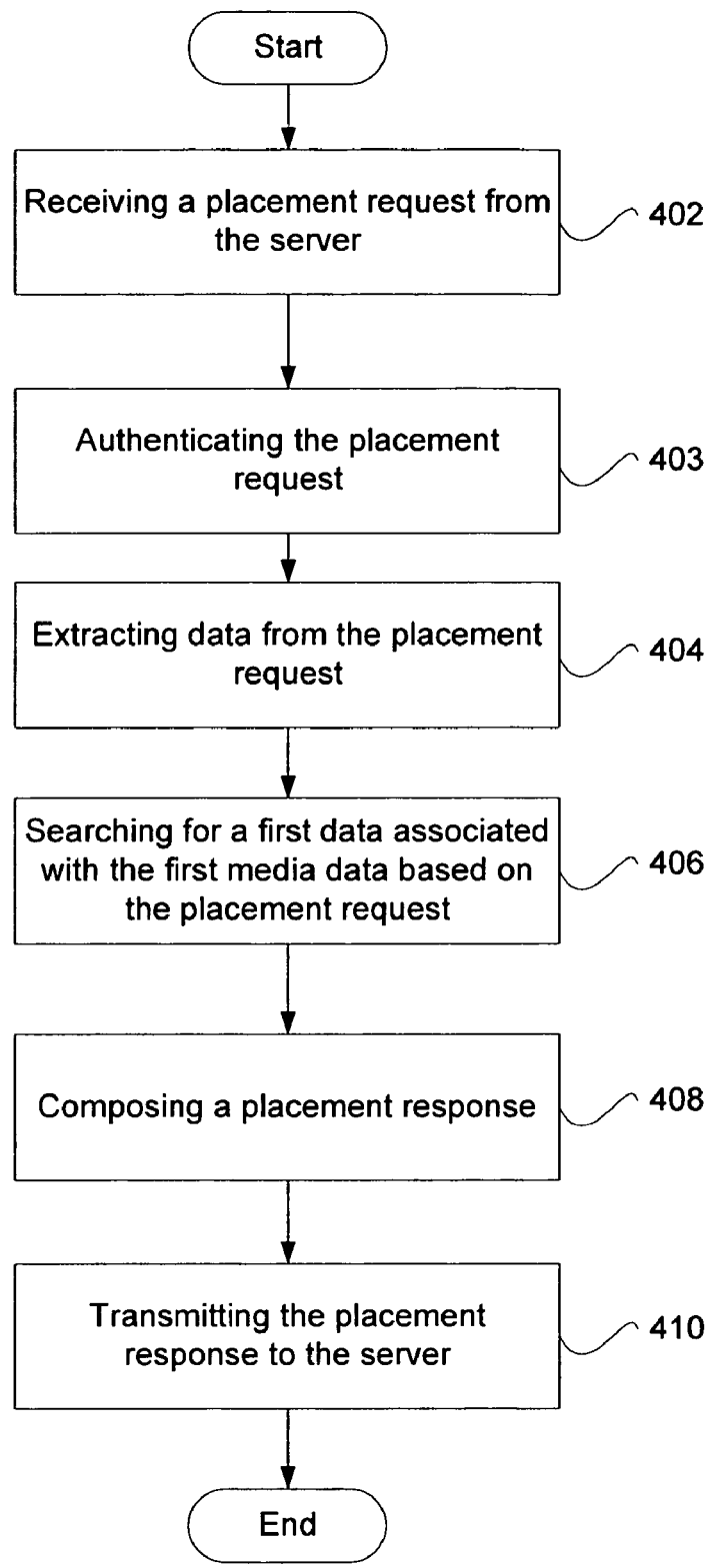
FIG. 4 is a flowchart diagram of the content provider service processing a placement request from a server, in accordance with an embodiment.

FIG. 4 is a flowchart diagram of the content provider service processing a placement request from a server, in accordance with an embodiment. In general, content provider service transmits the media data provided by advertisers to server for distribution and additionally allows advertisers to manage their media data. As shown in FIG. 4, in operation 402, the content provider service receives a placement request from the server. As discussed above, the placement request may include identification and/or authentication data that identify the content producers. The placement request may additionally include data identifying the media data provided by the content producers (hereafter "first media data") that are requested. In an embodiment, the placement request may be authenticated in operation 403. An exemplary authentication operation may include authenticating whether the placement request originated from authorized content producers. If the placement request cannot be validated, then the content provider service may transmit an error response to the server.

The content service provider receives the placement request when media processing software requests the first media data. Therefore, in some embodiments, the number of placement requests received from the server may be tracked. In other words, the content provider service may store a count of the number of placement requests received. The number of placement requests received may correspond to the number of advertisements placed. Accordingly, tracking the number of placement requests can correspond to tracking the number of advertisements placed. Furthermore, the filter module can detect when a transmission (or download) to the media processing software is complete or incomplete. In other words, the filter module can detect when the first and second media data are not completely transferred to the media processing software. If the transmission is incomplete, the filter module can request the content provider service to reduce or subtract the count of the number of placement requests received. The reduction of the count may be dependent on the particulars of the placement requests. For example, if the HTTP header identifies that a Flash-based player is requesting the first media data, and enough bytes have been transmitted such that the Flash-based player had played an advertisement (i.e., second media data) appearing at the beginning of the first media data, then the filter module may not transmit the request to reduce the count. On the other hand, if a Web browser was requesting the first media data, the Web browser would delete an incomplete first media data. Accordingly, the filter module may transmit a request to reduce the count for incomplete transmissions to Web browsers. In response to the request, the content provider service may reduce the count of the number of placement requests received.

After authentication, the content provider service extracts data (e.g., data identifying the first media data) from the placement request in operation 404. In an embodiment, the content provider service then searches for data that are associated with the first media data in operation 406 based on the data extracted from the request. In another embodiment, the content provider service may also search for data that are associated with other identification and/or authentication data included in the placement response. For example, data may include data identifying media data provided by advertisers (hereinafter "second media data") that may be inserted into the first media data. Another exemplary data may include a location associated with the first media data.

Thereafter, a placement response is composed in operation 408. In some embodiments, the placement response may be composed by formatting the data identifying the second media data and the location associated with the first media data into the placement response. The placement response may include a list of entries where each entry can include data identifying the second media data. For example, data can include a second media data identifier that uniquely identifies the second media data within the content provider service. The entry may additionally include the location associated with the first media data. For instance, a location code that indicates the time associated with the first media data where the second media data is to be inserted within the first media data. With the placement response composed, the content provider service transmits the placement response to the server in operation 410.

Figure 5:
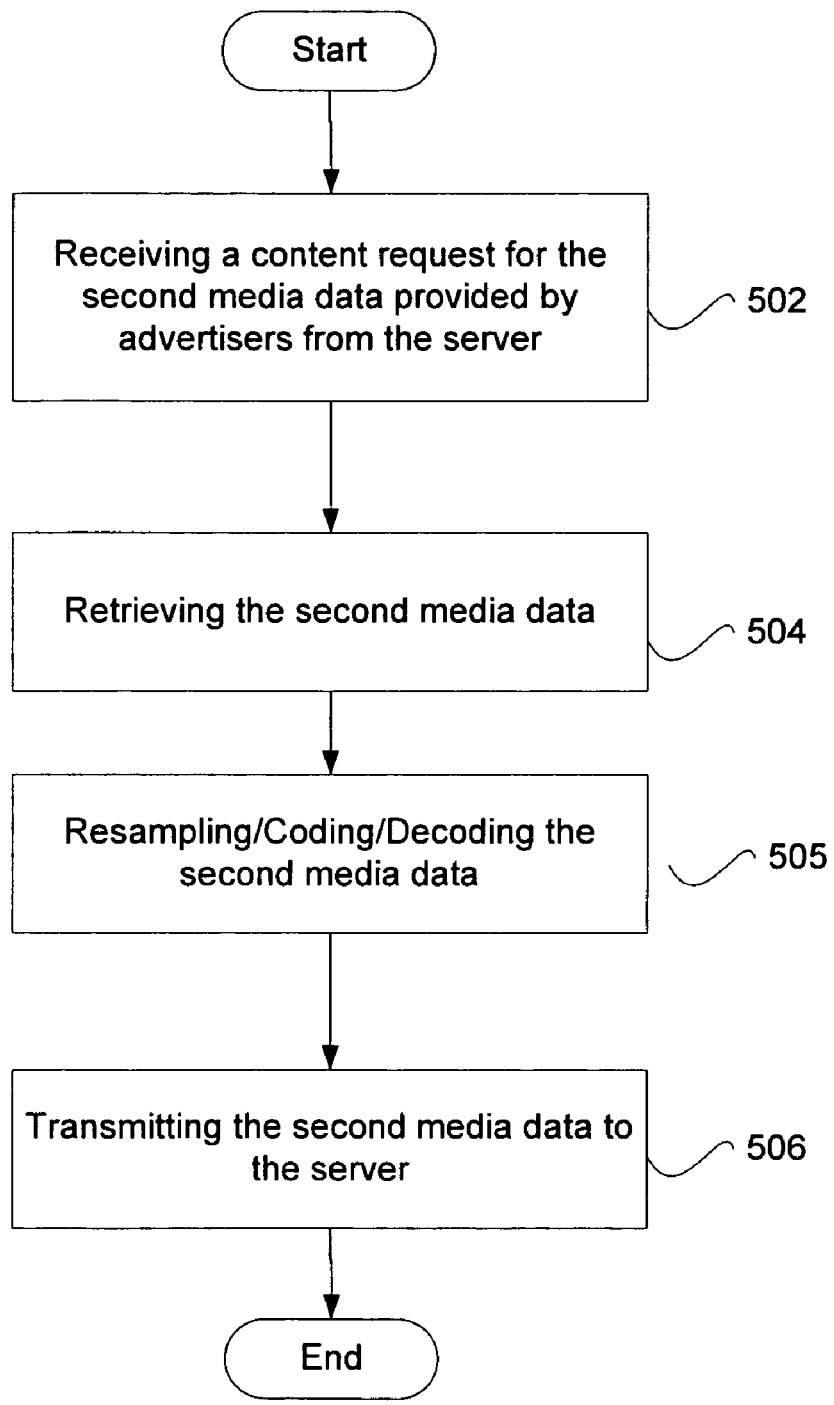
FIG. 5 is a flowchart diagram of the content provider service processing a content request from a server, in accordance with an embodiment.

FIG. 5 is a flowchart diagram of the content provider service processing a content request from a server, in accordance with an embodiment. As discussed above, the server may transmit a content request for media data provided by advertisers (hereinafter "second media data"). The content request may include data identifying the second media data and requested attributes (e.g., media format, sampling rate, size, and other attributes) associated with the second media data. As shown in FIG. 5, the content service provider receives the content request in operation 502. The content service provider parses the content request to extract data, such as data identifying the second media data and requested attributes. Thereafter, in operation 504, the content service provider retrieves the second media data.

In some embodiments, the attributes associated with the second media data can match the attributes associated with the media data provided by content providers (hereinafter "first media data"). If the attributes are different, then the second media data may be resampled, converted, decoded, and/or coded in operation 505 to match the attribute of the first media data. For example, the second media data may be resampled to match the bit-rate of the first media data. In another example, to match the media format of the first media data, the second media data may be recoded to MP3 format. It should be appreciated that a variety of known multimedia codecs, such as the multimedia codec of FIG. 2, may be included in the content service provider to resample/decode/encode the second media data. In another embodiment, the filter module may also include codecs to resample/decode/encode the second media data. Still referring to FIG. 5, after the second media data is retrieved, the content provider service transmits the second media data to the server in operation 506.

FIG. 6 is a block diagram illustrating an exemplary computer system suitable for the distribution of media data, in accordance with an embodiment. In some embodiments, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball).

According to some embodiments of the invention, computer system 600 performs specific operations by processor 604 executing one or more sequences of one or more instructions stored in system memory 606. Such instructions may be read into system memory 606 from another computer readable medium, such as static storage device 608 or disk drive 610. In some embodiments, hard-wired circuitry may be used in place of or in combination with software instructions to implement the invention.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602.

Common forms of computer readable media includes, for example, floppy disk, flexible disk, hard disk, magnetic tape, CD-ROM, punch cards, paper tape, solid state disk drives, or any other physical medium with patterns of holes, RAM, PROM, EPROM, FLASH-EPROM, any other memory chip or cartridge, or any other physical medium from which a computer can read.

In some embodiments of the invention, execution of the sequences of instructions to practice the invention is performed by a single computer system 600. According to some embodiments of the invention, two or more computer systems 600 coupled by communication link 620 (e.g., LAN, PSTN, or wireless network) may perform the sequence of instructions to practice the invention in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The above described embodiments provide methods and systems for inserting advertisements or other contents into media data transmissions and tracking the number of placed or inserted advertisements. By inserting the advertisements into the media data at the server that distributes the media data, the advertisements may be dynamically inserted at a variety of places within the media data. Furthermore, a count of the placement requests received by the content provider service provides an accurate tracking of the placed advertisements.

Although the foregoing embodiments have been described in some detail for purposes of clarity of understanding, implementations of the above-described system and techniques is not limited to the details provided. There are many alternative implementations and the disclosed embodiments are illustrative and not restrictive.

What is claimed is:

1. A method for receiving files using an Internet protocol, the method comprising:

receiving at a server a first audio and/or video media data file comprising first audio and/or video media data from a content producer over a computer network in data communication with a device configured to receive and play media data files, the first audio and/or video media data file comprising one or more attributes;

storing the first audio and/or video media data file;

transmitting a placement request associated with the first audio and/or video media data file to a content provider service over the computer network;

receiving a placement response from the content provider service, the placement response comprising data identifying a second audio and/or video media data file comprising one or more another attributes, the second audio and/or video media data file comprising second audio and/or video media data, the second audio and/or video media data file being associated with the first audio and/or video media data file, and the data identifying a location in the first audio and/or video media data, the location being defined based on a location code that indicates a time associated with the first audio and/or video media data file where the second audio and/or video media data file is to be inserted within the first audio and/or video media file and the location further being defined based on a duration specified by seconds;

retrieving the second audio and/or video media data file including the one or more another attributes;

analyzing a volume within the first audio and/or video media file at the location with respect to a threshold to determine whether a volume of the first audio and/or video media file at the location is below the threshold to determine potential insertion of the second audio and/or video media file at the location;

matching the one or more attributes with the one or more another attributes;

merging the second audio and/or video media data with the first audio and/or video media data at the location in the first audio and/or video media data when one or more another attributes of the second audio and/or video media data file are determined to match the one or more attributes of the first audio and/or video media data file;

converting the second audio and/or video media data file into a third audio and/or video media data file comprising third audio and/or video media data and merging the third audio and/or video media data with the first audio and/or video media data to form a merged audio and/or video media data file comprising merged audio and/or video media data at the location in the first audio and/or video media data when the one or more another attributes of the second audio and/or video media data file are determined to not match the one or more attributes of the first audio and/or video media data file, wherein the one or more attributes and the one or more another attributes are each comprised of a media format and a sampling rate;

storing the merged audio and/or video media data file; and transmitting the merged audio and/or video media data file from the server over the computer network to the device configured to receive and play media data files, wherein the second audio and/or video media data are merged with the first audio and/or video media data at the location in the first audio and/or video media data when the one or more another attributes of the second audio and/or video media data file match the one or more attributes of the first audio and/or video media data file and when a maximum volume of the first audio and/or video media file at the location is below the threshold, wherein, when the maximum volume of the first audio and/or video media file at the location exceeds the threshold, the location is moved towards both a beginning and end of the first audio and/or video media data until the maximum volume of the first audio and/or video media file at the moved location is below the threshold or until the location has been moved by a specified time, wherein the second audio and/or video media data are merged with the first audio and/or video media data at the moved location in the first audio and/or video media data when the one or more another attributes of the second audio and/or video media data file are determined to match the one or more attributes of the first audio and/or video media data file and when the maximum volume of the first audio and/or video file at the moved location is below the threshold, and wherein the second audio and/or video media data are not merged with the first audio and/or video media data when the maximum volume of the first audio and/or video file at the moved location exceeds the threshold and has been moved by the specified time.

2. The method of claim 1, wherein the retrieving the second audio and/or video media data file comprises retrieving the second audio and/or video media data file from a cache associated with the server.

3. The method of claim 1, wherein the retrieving the second audio and/or video media data file comprises:
sending a content request to the content provider service for the second audio and/or video media data file; and
receiving the second audio and/or video media data file from the content provider service.

4. The method of claim 3, wherein the content request comprises the data identifying the second audio and/or video media data file and an attribute associated with the second audio and/or video media data file.

5. The method of claim 1, wherein the server is configured as a World Wide Web (Web) server.

6. A method, comprising:
receiving a placement request from a server over a computer network in data communication with a device configured to receive and play media data files, the placement request identifying a first audio and/or video media data file, the first audio and/or video media data file comprising one or more attributes, and the first audio and/or video media data file comprising first audio and/or video media data;
searching for a first data associated with the first audio and/or video media data file based on the placement request, the first data comprising a second data identifying a second audio and/or video media data file comprising one or more another attributes, the second audio and/or video data file comprising second audio and/or video data, the second audio and/or video media data file being associated with the first audio and/or video media data file and the first data comprising a third data identifying a location in the first audio and/or video media data, the location being defined based on a location code that indicates a time associated with the first audio and/or video media data file where the second audio and/or video media data file is to be inserted within the first audio and/or video media file and the location further being defined based on a duration specified by seconds;
composing a placement response comprising the first data;
transmitting the placement response to the server over the computer network;
analyzing a volume within the first audio and/or video media file at the location with respect to a threshold to determine whether a volume of the first audio and/or video media file at the location is below the threshold to determine potential insertion of the second audio and/or video media file at the location;
receiving a content request for the second audio and/or video media data file from the server;
retrieving the second audio and/or video media data file;
determining if the one or more another attributes of the second audio and/or video media data file match the one or more attributes of the first audio and/or video media data file, wherein the one or more attributes and the one or more another attributes are each comprised of a media format and a sampling rate; and
in response to the content request:
if the one or more another attributes of the second audio and/or video media file are determined to match the one or more attributes of the first audio and/or video media data file and if a maximum volume of the first audio and/or video media file at the location is below the threshold, transmitting the second audio and/or video media data to the server to be at the location in the first audio and/or video media data, and
if the maximum volume of the first audio and/or video media file at the location exceeds the threshold:
moving the location towards both a beginning and end of the first audio and/or video media data until the maximum volume of the first audio and/or video media file at the moved location is below the threshold or until the location has been moved by a specified time,
transmitting the second audio and/or video media data to the server to be at the moved location in the first audio and/or video media data if the one or more another attributes of the second audio and/or video media data file are determined to match the one or more attributes of the first audio and/or video media data file and if the maximum volume of the first audio and/or video file at the moved location is below the threshold, wherein the second audio and/or video media data is not transmitted to the server to be at the moved location in the first audio and/or video media data if the maximum volume of the first audio and/or video file at the moved location exceeds the threshold and has been moved by the specified time, and
if the one or more another attributes of the second audio and/or video media file are determined not to match the one or more attributes of the first audio and/or video media data file:
converting the second audio and/or video media data file to a third audio and/or video media data file; and
transmitting the third audio and/or video media data file to the server.

7. The method of claim 6, further comprising authenticating the placement request.

8. The method of claim 6, further comprising tracking a number of the placement request received from the server.

9. The method of claim 8, further comprising reducing the number of the placement request received from the server if the first and second audio and/or video media data are not completely transferred to a media processor on the server.

10. The method of claim 6, wherein the composing the placement response comprises formatting the second data identifying the second audio and/or video media data file associated with the first audio and/or video media data file and the location associated with the first audio and/or video media data into the placement response.

11. The method of claim 6, wherein the server is configured as a World Wide Web (Web) server.

12. A system, comprising:
a media processor that processes media comprising computer instructions for transmitting a request for a first audio and/or video media data file comprising first audio and/or video media data to a server over a computer network from a device configured to receive and play media data files; and
the server in communication with the media processor comprising computer instructions stored in a memory associated with a computer and a processor for:
    receiving the request for the first audio and/or video media data file comprising one or more attributes from the media processor;
    transmitting a placement request to a content provider service over the computer network, the placement request comprising a first data identifying the first audio and/or video media data file;
    receiving a placement response from the content provider service over the computer network, the placement response comprising a second data identifying a second audio and/or video media data file comprising one or more another attributes, the second audio and/or video media data file comprising second audio and/or video media data, and the second audio and/or video media data file being associated with the first audio and/or video media data file and a location in the first audio and/or video media data, the location being defined based on a location code that indicates a time associated with the first audio and/or video media data file where the second audio and/or video media data file is to be inserted within the first audio and/or video media file and the location further being defined based on a duration specified by seconds;
    retrieving the second audio and/or video media data file including the one or more another attributes;
    analyzing a volume within the first audio and/or video media file at the location with respect to a threshold to determine whether a volume of the first audio and/or video media file at the location is below the threshold to determine potential insertion of the second audio and/or video media file at the location;
    merging the second audio and/or video media data with the first audio and/or video media data at the location in the first audio and/or video media data when one or more another attributes of the second audio and/or video media data file are determined to match the one or more attributes of the first audio and/or video media data file;
    converting the second audio and/or video media data file into a third audio and/or video media data file comprising third audio and/or video media data and merging the third audio and/or video media data into the first audio and/or video media data at the location in the first audio and/or video media data to form a merged audio and/or video media data file comprising merged audio and/or video media data when the one or more another attributes of the second audio and/or video media data file are determined to not match the one or more attributes of the first audio and/or video media data file, wherein the one or more attributes and the one or more another attributes are each comprised of a media format and a sampling rate; and
    transmitting the merged audio and/or video media data file to the media processor over the computer network to the device configured to receive and play the media data files,
    wherein the second audio and/or video media data are merged with the first audio and/or video media data at the location in the first audio and/or video media data when the one or more another attributes of the second audio and/or video media data file match the one or more attributes of the first audio and/or video media data file and when a maximum volume of the first audio and/or video media file at the location is below the threshold,
    wherein, when the maximum volume of the first audio and/or video media file at the location exceeds the threshold, the location is moved towards both a beginning and end of the first audio and/or video media data until the maximum volume of the first audio and/or video media file at the moved location is below the threshold or until the location has been moved by a specified time,
    wherein the second audio and/or video media data are merged with the first audio and/or video media data at the moved location in the first audio and/or video media data when the one or more another attributes of the second audio and/or video media data file are determined to match the one or more attributes of the first audio and/or video media data file and when the maximum volume of the first audio and/or video file at the moved location is below the threshold, and
    wherein the second audio and/or video media data are not merged with the first audio and/or video media data when the maximum volume of the first audio and/or video file at the moved location exceeds the threshold and has been moved by the specified time.

13. The system of claim 12, further comprising the content provider service in communication with the server comprising computer instructions for
    receiving the placement request from the server over the computer network;
    composing the placement response; and
    transmitting the placement response to the server over the computer network.

14. The system of claim 12, further comprising the content provider service in communication with the server comprising computer instructions for tracking a number of the placement request received from the server over the computer network.

15. The system of claim 12, wherein the placement request further comprises an attribute associated with the first audio and/or video media data file.

16. The system of claim 12, further comprising the content provider service in communication with the server comprising computer instructions for:
    receiving a content request for the second audio and/or video media data file from the server over the computer network;
    retrieving the second audio and/or video media data file; and
    transmitting the content request to the server over the computer network.

17. The system of claim 12, wherein the server is configured as a World Wide Web (Web) server.

18. A computer program product embodied in a non-transitory computer readable storage medium, the computer program product being executed by a computer, comprising computer instructions for:
receiving a first data identifying a location of a first audio and/or video media data file from a World Wide Web (Web) server in data communication with the computer using a computer network, the first audio and/or video media data file comprising first audio and/or video media data and one or more attributes;
transmitting a placement request to a content provider service over the computer network;
receiving a placement response from the content provider service, the placement response comprising a second data identifying a location of a second audio and/or video media data file comprising second audio and/or video data and one or more another attributes, the second audio and/or video media data file being associated with the first audio and/or video media data file, the location identifying a point in the first audio and/or video media data and a duration, the duration defined by seconds or minutes;
analyzing a volume within the first audio and/or video media file at the location with respect to a threshold to determine whether a volume of the first audio and/or video media file at the location is below the threshold to determine potential insertion of the second audio and/or video media file at the location;
merging the second audio and/or video media data with the first audio and/or video media data at the location in the first audio and/or video media data when one or more another attributes of the second audio and/or video media data file are determined to match the one or more attributes of the first audio and/or video media data file;
converting the second audio and/or video media data file into a third audio and/or video media data file comprising third audio and/or video media data and merging the third audio and/or video media data into the first audio and/or video media data at the location in the first audio and/or video media data to form a merged audio and/or video media data file comprising merged audio and/or video media data when the one or more another attributes of the second audio and/or video media data file are determined to not match the one or more attributes of the first audio and/or video media data file, wherein the one or more attributes and the one or more another attributes are each comprised of a media format and a sampling rate; and
transmitting the merged audio and/or video media data file to the Web server over the computer network to a device configured to receive and play media data files comprising the merged audio and/or video media data file,
wherein the second audio and/or video media data are merged with the first audio and/or video media data at the location in the first audio and/or video media data when the one or more another attributes of the second audio and/or video media data file match the one or more attributes of the first audio and/or video media data file and when a maximum volume of the first audio and/or video media file at the location is below the threshold,
wherein, when the maximum volume of the first audio and/or video media file at the location exceeds the threshold, the location is moved towards both a beginning and end of the first audio and/or video media data until the maximum volume of the first audio and/or video media file at the moved location is below the threshold or until the location has been moved by a specified time,
wherein the second audio and/or video media data are merged with the first audio and/or video media data at the moved location in the first audio and/or video media data when the one or more another attributes of the second audio and/or video media data file are determined to match the one or more attributes of the first audio and/or video media data file and when the maximum volume of the first audio and/or video file at the moved location is below the threshold, and
wherein the second audio and/or video media data are not merged with the first audio and/or video media data when the maximum volume of the first audio and/or video file at the moved location exceeds the threshold and has been moved by the specified time.

19. A computer program product embodied in a non-transitory computer readable storage medium, the computer program product being executed by a computer, comprising computer instructions for:
receiving a first audio and/or video media data file at a World Wide Web (Web) server over a computer network, the first audio and/or video media data file comprising first audio and/or video media data and one or more attributes;
transmitting a placement request to a content provider service over the computer network;
receiving a placement response from the content provider service; the placement response comprising a temporal location and data identifying a second audio and/or video media data file, the second audio and/or video media data file comprising second audio and/or video media data and one or more another attributes, and the second audio and/or video media data file being associated with the first audio and/or video media data file, the location identifying a point in the first audio and/or video media data and a duration, the duration defined by seconds or minutes;
sending a content request to the content provider service for the second audio and/or video media data file;
receiving the second audio and/or video media data file from the content provider service;
analyzing a volume within the first audio and/or video media file at the location with respect to a volume threshold to determine whether a volume of the first audio and/or video media file at the location is below the threshold to determine potential insertion of the second audio and/or video media file at the location;
merging the second audio and/or video media data with the first audio and/or video media data at the location in the first audio and/or video media data when one or more another attributes of the second audio and/or video media data file are determined to match the one or more attributes of the first audio and/or video media data file;
converting the second audio and/or video media data file into a third audio and/or video media data file comprising third audio and/or video media data and merging the third audio and/or video media data into the first audio and/or video media data at the location in the first audio and/or video media data to form a merged audio and/or video media data file when the one or more another attributes of the second audio and/or video media data file are determined to not match the one or more attributes of the first audio and/or video media data file; and transmitting the merged audio and/or video media data file to the Web server over a computer network to a device configured to receive and play media data files comprising the merged audio and/or video media data file wherein the second audio and/or video media data are merged with the first audio and/or video media data at the location in the first audio and/or video media data when the one or more another attributes of the second audio and/or video media data file match the one or more attributes of the first audio and/or video media data file and when a maximum volume of the first audio and/or video media file at the location is below the threshold, wherein, when the maximum volume of the first audio and/or video media file at the location exceeds the threshold, the location is moved towards both a beginning and end of the first audio and/or video media data until the maximum volume of the first audio and/or video media file at the moved location is below the threshold or until the location has been moved by a specified time, wherein the second audio and/or video media data are merged with the first audio and/or video media data at the moved location in the first audio and/or video media data when the one or more another attributes of the second audio and/or video media data file are determined to match the one or more attributes of the first audio and/or video media data file and when the maximum volume of the first audio and/or video file at the moved location is below the threshold, and wherein the second audio and/or video media data are not merged with the first audio and/or video media data when the maximum volume of the first audio and/or video file at the moved location exceeds the threshold and has been moved by the specified time.

20. The method of claim 1, further comprising:

receiving a request for the first audio and/or video media data file from the device configured to receive and play the media data files;

determining whether or not to filter the first audio and/or video media data at the server based on information from the request; and transmitting the first audio and/or video media data file over the computer network to the device upon determining not to filter the first audio and/or video media data file.

21. The method of claim 1, wherein merging the second audio and/or video media data with the first audio and/or video media data comprises preserving metadata associated the first audio and/or video media data file and erasing metadata associated with the second audio and/or video media data file.

22. The method of claim 8, wherein the number of the placement request is tracked according to a type of media processing software utilized at the device configured to receive the and play the media data files.

* * * * *